(12) United States Patent
Zuber

(10) Patent No.: US 7,926,821 B2
(45) Date of Patent: Apr. 19, 2011

(54) CHASSIS ARRANGEMENT WITH STABILIZING SYSTEM FOR CONTROLLING A DRIVING STABILITY OF A MOTOR VEHICLE

(75) Inventor: Armin Zuber, Meckesheim (DE)

(73) Assignee: Benteler Automobiltechnik GmbH, Paderborn (DE)

(*) Notice: Subject to any disclaimer, the term of this patent is extended or adjusted under 35 U.S.C. 154(b) by 836 days.

(21) Appl. No.: 11/678,328

(22) Filed: Feb. 23, 2007

(65) Prior Publication Data

US 2007/0193841 A1 Aug. 23, 2007

(30) Foreign Application Priority Data

Feb. 23, 2006 (DE) .................. 10 2006 008 995
Mar. 14, 2006 (DE) .................. 10 2006 012 110

(51) Int. Cl.
B60R 21/055 (2006.01)
(52) U.S. Cl. ............ 280/5.511; 280/5.506; 280/124.106
(58) Field of Classification Search ............... 280/5.511, 280/124.106, 5.502, 5.506; 188/381; 267/196, 267/277
See application file for complete search history.

(56) References Cited

U.S. PATENT DOCUMENTS

| | | | | |
|---|---|---|---|---|
| 4,796,911 A | * | 1/1989 | Kuroki et al. | 280/5.511 |
| 5,311,821 A | * | 5/1994 | Lang et al. | 105/199.2 |
| 5,839,547 A | * | 11/1998 | Bieker | 188/73.31 |
| 5,882,017 A | * | 3/1999 | Carleer | 280/5.508 |
| 6,026,338 A | * | 2/2000 | Borschert et al. | 701/37 |
| 6,149,166 A | * | 11/2000 | Struss et al. | 280/5.511 |

FOREIGN PATENT DOCUMENTS

| | | | |
|---|---|---|---|
| DE | 40 37 672 A1 | | 6/1992 |
| DE | 195 00 869 A1 | | 7/1995 |
| DE | 198 21 209 A1 | | 11/1998 |
| DE | 198 46 275 A1 | | 12/1999 |
| GB | 2285778 A | * | 7/1995 |
| JP | 60213260 A | * | 10/1985 |
| JP | 62131 812 A | | 6/1987 |

\* cited by examiner

*Primary Examiner* — Paul N Dickson
*Assistant Examiner* — Timothy D Wilhelm
(74) *Attorney, Agent, or Firm* — Henry M. Feiereisen; Ursula B. Day

(57) ABSTRACT

A chassis arrangement includes a stabilizer having a single-piece center part with opposite ends, a first stabilizer arm connected to one of the opposite ends of the center part, and a second stabilizer arm connected to the other one of the opposite ends of the center part. A stabilizer support assembly having two support units supports the center part in relation to a vehicle body. Operatively connected to the center part are at least two brake units for influencing a twistability of the center part, with one of the brake units being arranged between one of the support units and an adjacent one of the first and second stabilizer arms, and the other one of the brake units being arranged between the other one of the support units and an adjacent one of the first and second stabilizer arms.

63 Claims, 5 Drawing Sheets

CHASSIS ARRANGEMENT WITH STABILIZING SYSTEM FOR CONTROLLING A DRIVING STABILITY OF A MOTOR VEHICLE

CROSS-REFERENCES TO RELATED APPLICATIONS

This application claims the priority of German Patent Applications, Serial No. 10 2006 008 995.2, filed Feb. 23, 2006, and 10 2006 012 110.4, filed Mar. 14, 2006, pursuant to 35 U.S.C. 119(a)-(d), the contents of which are incorporated herein by reference in its entirety as if fully set forth herein.

BACKGROUND OF THE INVENTION

The present invention relates, in general, to a chassis arrangement with a stabilizing system for controlling a stability of a motor vehicle during travel.

Nothing in the following discussion of the state of the art is to be construed as an admission of prior art.

Motor vehicles have stabilizers for compensating a rolling tendency of the vehicle as a consequence of a transversal acceleration when negotiating a curve. A stabilizer is operatively connected to a vehicle axle to introduce a support torque in opposition to the rolling torque in wheel carrier units. Normally both axles are equipped with a stabilizer.

Stabilizers typically include a single piece construction of a U-shaped metal rod with a torsionally yielding center part and stabilizer arms that connect to the center part. The center part extends transversely to the longitudinal vehicle axis and is supported in relation to the vehicle body or a chassis underframe, i.e. an auxiliary frame of the chassis arrangement, by two stabilizer bearings. The stabilizer mounts are disposed at the free ends of the stabilizer arms for securement of the stabilizer to the adjacent wheel carrier units. The stabilizer can be equipped with actuators in order to actively affect the chassis behavior. For example, hydraulic piston and cylinder units are installed between the stabilizer mounts and the wheel carrier units. By operating the piston and cylinder units, the action by the stabilizer can be boosted or decreased. In addition, the level can be adjusted by bilateral operation and operation in same direction of the actuators.

Another approach to configure a stabilizer involves a separation in midsection of the stabilizer into stabilizer portions and the disposition of an electric motor as coupling or brake unit between the stabilizing portions. In this way, each stabilizer portion can be rotated individually or in opposition to the other stabilizer portion so long as the electric motor has been appropriately supported.

However, for a number of reasons, the various proposals are endowed with drawbacks and shortcomings relating for example to their very complex configuration or to the effect that is hoped to be obtained but may not always be realized. In addition, they are very energy-intensive to implement the control performance. Also, hydraulic actuators and electric motors operate very sluggishly and thus are not entirely suitable to influence vehicle body vibration in dependence on the vibration cycle.

It would therefore be desirable and advantageous to provide an improved chassis arrangement which obviates prior art shortcomings and which is simple in structure and yet reliable in operation to enable a targeted change in the rolling rate and/or vehicle body vibration.

SUMMARY OF THE INVENTION

According to one aspect of the present invention, a chassis arrangement includes a stabilizer having a first stabilizer portion and a second stabilizer portion separated in midsection of the stabilizer, a brake unit coupling the first and second stabilizer portions for influencing a relative rotation between the first and second stabilizer portions, with the brake unit being constructed in the form of a disk brake, and a bearing unit disposed between neighboring ends of the first and second stabilizer portions for mutually supporting the first and second stabilizer portions.

The present invention resolves prior art problems by arranging a bearing between the confronting ends of the stabilizer portions so as to mutually support the stabilizer portions, and by constructing the brake unit as a disk brake. As a result, the stiffness against rotation of the stabilizer can be adjusted without the need for one or more actuators. Still, the rolling rate and thus the vehicle body vibration can be influenced cycle-dependent. Compared to conventional proposals, a chassis arrangement according to the invention is more cost-efficient to manufacture, weighs less, and consumes less energy for operation.

According to another feature of the present invention, the brake device may include a brake caliper secured to the end of one of the first and second stabilizer portions, and a brake disk secured to the end of the other one of the first and second stabilizer portions.

According to another feature of the present invention, the bearing unit has a housing for outside attachment of the brake disk. In this way, the chassis arrangement is especially compact.

According to another feature of the present invention, the bearing unit may be constructed as a roller bearing or ball bearing. In this way, high forces can be transmitted in radial direction and to a lesser extent in axial direction. As an alternative, the bearing unit may be constructed as a sliding bearing. The running surfaces may hereby be provided directly on one end of the stabilizer or on the inside of the bearing housing so that the number of components can be reduced.

According to another aspect of the present invention, a chassis arrangement includes a stabilizer having a single-piece center part, a first stabilizer arm connected to one end of the center part and a second stabilizer arm connected to the other end of the center part, a stabilizer support assembly having two support units for supporting the center part in relation to a vehicle body, and at least two brake units operatively connected to the center part for influencing a twistability of the center part, wherein one of the brake units is arranged between one of the support units and an adjacent one of the first and second stabilizer arms, and the other one of the brake units is arranged between the other one of the support units and an adjacent one of the first and second stabilizer arms.

This embodiment of the chassis arrangement according to the invention is effective because the provision of the brake units enables a change in rotation of the center part from a base stiffness to higher values. Energy consumption for affecting the twistability of the center part is substantially less compared to conventional approaches. The decentralized disposition of the brake units further permits a better utilization of the available installation space. The use of conventional dampers between the stabilizer and the wheel carrier units can be eliminated or at least dampers can be sized smaller as vehicle body vibration can be compensated by the brake units.

According to yet another aspect of the present invention, a chassis arrangement includes a stabilizer having a first stabilizer portion and a second stabilizer portion separated in midsection of the stabilizer, a device, coupling the first and second stabilizer portions, for influencing a relative rotation capability between the first and second stabilizer portions, a bearing assembly having a first and second stabilizer supports for respectively supporting the first and second stabilizer portions in relation to a vehicle body, a first brake unit secured to one of the first and second stabilizer portions for affecting a twistability of the one of the first and second stabilizer portions, and a second brake unit secured to the other one of the first and second stabilizer portions for affecting a twistability of the other one of the first and second stabilizer portions.

According to another feature of the present invention, the first brake unit may be disposed between one of the first and second stabilizer supports and an adjacent stabilizer arm of one of the first and second stabilizer portions, and the second brake unit may be disposed between the other one of the first and second stabilizer supports and an adjacent stabilizer arm of the other one of the first and second stabilizer portions. In this way, the distance between the brake units and the stabilizer arms is short. As an alternative, the first brake unit may be disposed between one of the first and second stabilizer supports and the device for influencing a relative rotation between the first and second stabilizer portions, and the second brake unit may be disposed between the other one of the first and second stabilizer supports and the device for influencing a relative rotation between the first and second stabilizer portions. This approach makes better use of the available installation space between the stabilizer supports.

According to another feature of the present invention, at least one of the first and second brake units may be a disk brake. The arrangement of a disk brake is especially simple to implement and high braking torques can be introduced into the stabilizer in a cost-efficient manner. The disk brake may include a brake disk which is detachably secured to one of the first and second stabilizer portions. When worn out, such a brake disk can easily be replaced.

According to another feature of the present invention, the brake disk may be constructed for selective securement to the one of the first and second stabilizer portions in several positions spaced about a rotation angle in circumferential direction of the brake disk. As the brake disk wears off only in a narrow brake zone, it becomes possible to turn the brake disk so that an unused zone can be activated. As a result, there is no need to completely dismantle the brake unit and/or replace the brake disk.

According to another feature of the present invention, the brake disk may have a brake zone in the form of a ring segment. This ring segment can be secured about its circumference to a hub, thereby realizing a particularly weight-optimized and compact embodiment.

According to another feature of the present invention, the first and second brake units may be constructed for independent operation. As a result, the support torques can be individually controlled on each vehicle side.

According to another feature of the present invention, the first and second brake units may be constructed for continuous adjustability between a fixed rotative engagement and a fully disengaged state. As a result, the characteristic of the roll stabilization can be controlled by an analog closed loop. As an alternative, the first and second brake units may also be constructed for a multistage adjustability between a fixed rotative engagement and a fully disengaged state. The control system for the chassis arrangement becomes much simpler in this way.

According to another feature of the present invention, at least one of the first and second brake units may be constructed for electromechanical operation or hydraulic operation. Hydraulic operation enables transmission of high braking forces whereas electromechanical operation is more compact.

According to another feature of the present invention, at least one of the first and second brake units may be constructed as an eddy current brake. A magnetic field is hereby induced in the brake disk to oppose the rotation direction of the brake disk. Eddy current brakes are basically wear-resistant.

According to another feature of the present invention, a support unit may be provided for supporting at least one of the first and second brake units in relation to the vehicle body. As a result, forces can be introduced directly into the vehicle body. As an alternative, at least one of the first and second brake units may also be supported in relation to a chassis underframe. Thus, the chassis arrangement can be prefabricated together with the brake units and the final installation underneath a vehicle body can be robot-controlled.

According to another feature of the present invention, a controller may be operatively connected to at least one of the first and second brake units and/or the device for influencing a relative rotation between the first and second stabilizer portions. The controller provides a dynamic control of the brake unit. The controller may hereby be controlled by a microprocessor and best suited to various vehicle types and travel situations through application of appropriate software.

According to another feature of the present invention, the controller may be adjustable by a driver of a motor vehicle equipped with the chassis arrangement. Thus, the chassis characteristic can be influenced by the driver before and during travel so as to be able to switch between a sporty ride or a more comfortable ride.

According to another feature of the present invention, the controller may be operatively connected to a sensor assembly. The senor assembly enables establishment of a closed loop that permits an effective control of the chassis arrangement. The sensor assembly may include at least one acceleration sensor which may be structured to ascertain a transversal acceleration and thus to determine a rolling tendency. The sensor assembly may also include a plurality of acceleration sensors for ascertaining accelerations in different effective directions. As a result, further acceleration vectors, in particular in travel direction, can be determined in addition to the transversal acceleration. The sensor assembly may also include at least one speed sensor by which a speed-dependent control of the chassis arrangement can be realized, and a sensor for ascertaining the condition of a road surface, in particular with respect to a road surface temperature. Suitably, a sensor for detecting a wheel carrier compression may be arranged at one wheel carrier, preferably each wheel carrier. Such a sensor is better able to dynamically determine spring compression. The sensor assembly may also include a sensor for ascertaining meteorological data. Examples of meteorological data include outside temperature, presence of rain and intensity thereof.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
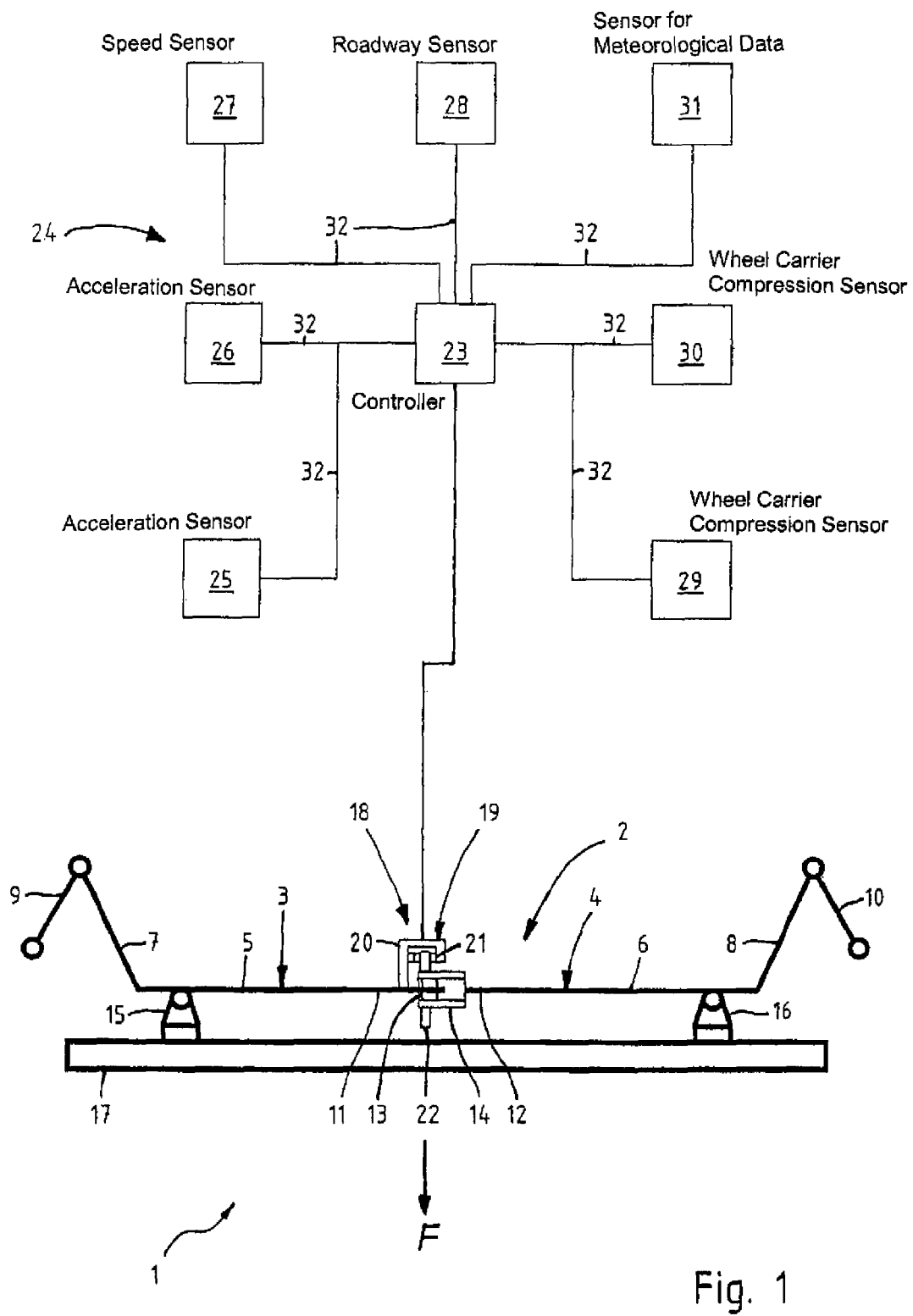
FIG. 1 is a schematic top plan view of a first embodiment of a chassis arrangement according to the present invention.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a first embodiment of a chassis arrangement according to the present invention, generally designated by reference numeral 1, for a motor vehicle, not shown in greater detail. The chassis arrangement 1 includes a stabilizer 2 which has a first stabilizer portion 3 and a second stabilizer portion 4 which are separated from one another in midsection of the stabilizer 2. Reference sign F designates a travel direction of the motor vehicle. The stabilizer portion 3 has an inner part 5 which is made torsionally yielding and is continued externally by a stabilizer arm 7 for attachment of the stabilizer 1 to a wheel carrier unit 9. Likewise, the stabilizer portion 4 has an inner part 6 which is made torsionally yielding and continued externally by a stabilizer arm 8 for attachment of the stabilizer 1 to a wheel carrier unit 10. A bearing unit 13 is arranged between neighboring ends 11, 12 of the stabilizer portions 3, 4 for mutual support of the stabilizer portions 3, 4. The bearing unit 13 can be constructed as a roller bearing and arranged in a housing 14 which is secured to the end 12 of the stabilizer portion 4. Instead of a roller bearing, the bearing unit 13 may also be constructed as a ball bearing or a sliding bearing. The stabilizer portion 3 is supported on a vehicle body 17 by a stabilizer support 15, whereas the stabilizer portion 4 is supported on the vehicle body 17 by a stabilizer support 16.

The stabilizer portions 3, 4 are coupled by a brake unit, generally designated by reference numeral 18, for influencing a relative rotation between the stabilizer portions 3, 4. The brake unit 18 is constructed as a disk brake 19 having a brake caliper 20 with accommodated brake shoes 21. Welded to the outside of the housing 14 of the bearing unit 13 is a brake disk 22 which is operated electromechanically. The brake unit 18 is constructed for continuous control between a fixed rotative engagement and a fully disengaged state.

Operatively connected to the brake unit 18 is a controller 23 which is mounted onto the vehicle body 17 and is adjustable by the driver before or during travel to provide a sporty or more comfortable chassis characteristic. The controller 23 is operatively connected to a sensor assembly, generally designated by reference numeral 24. The sensor assembly 24 includes one or more, here two acceleration sensors 25, 26 to ascertain a transversal acceleration and acceleration in travel direction F of the motor vehicle. Further provided is a speed sensor 27 for determining the travel speed of the motor vehicle. A roadway sensor 28 of the sensor assembly ascertains the condition of the roadway by determining the inclination, coefficient of adhesion and/or temperature of the road surface. The sensor assembly 24 further includes two wheel carrier compression sensors 29, 30 respectively associated to the wheel carrier units 9, 10 for determining a spring compression of the wheel carrier units 9, 10. Reference numeral 31 designates a sensor for acquiring meteorological data, such as outside temperature and presence of rain. The sensors 25-31 of the sensor assembly 24 are operatively connected to the controller 23 by signal transmitting lines 32.

Figure 2:
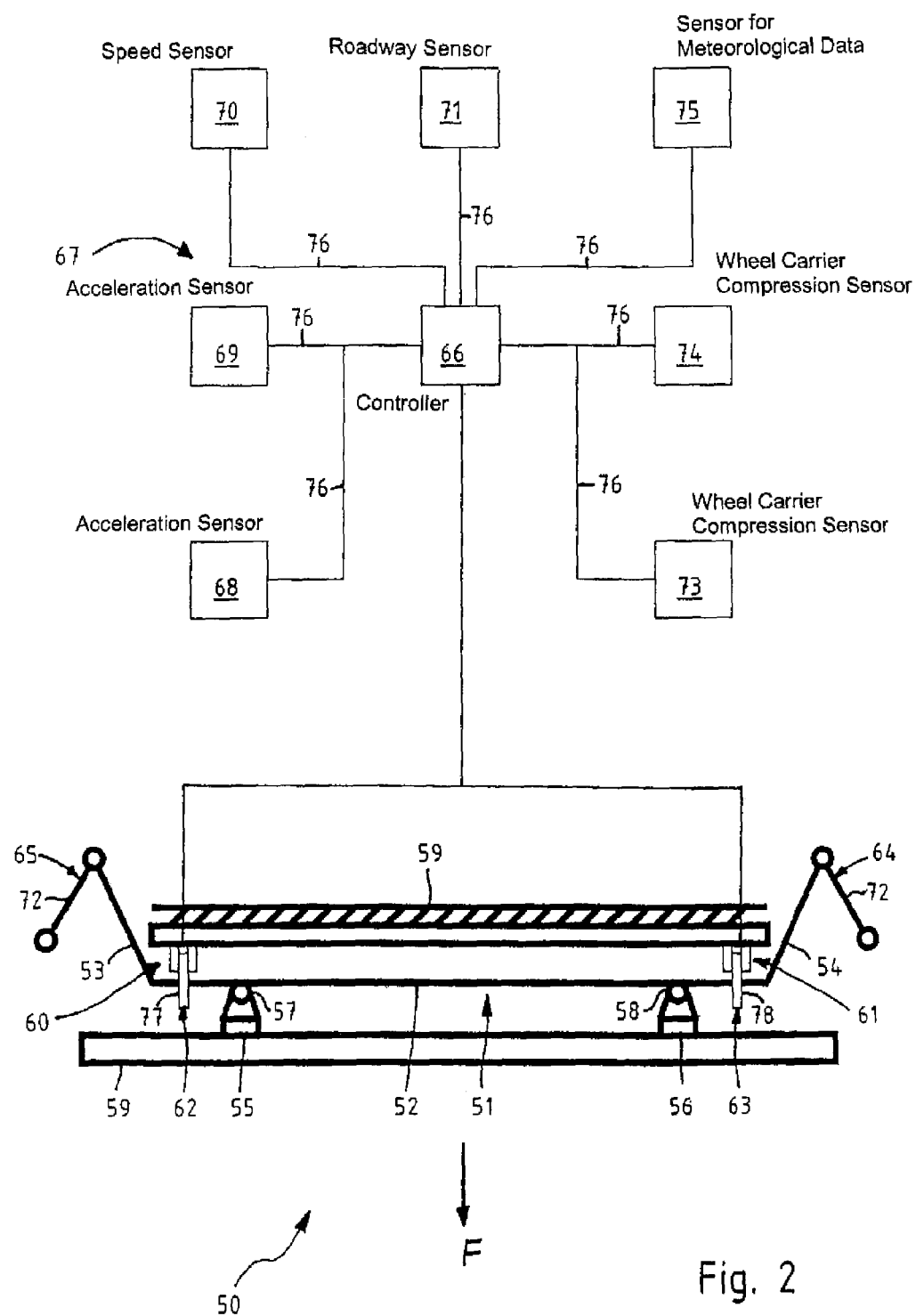
FIG. 2 is a schematic top plan view of a second embodiment of a chassis arrangement according to the present invention.

FIG. 2 shows a schematic top plan view of a second embodiment of a chassis arrangement according to the present invention, generally designated by reference numeral 50. The chassis arrangement 50 includes a stabilizer 51 having a single-piece center part 52 and stabilizer arms 53, 54, connected to respective ends of the center part 52. The center part 52 is made torsionally yielding and supported by two stabilizing supports 55, 66 with rolling-contact bearings 57, 58 on a vehicle body 59.

Detachably secured to the center part 52 are two brake units 60, 61 by which the twistability of the center part 52 can be modified. The brake units 60, 61 are supported by the vehicle body 59 and constructed as disk brakes 62, 63, with disk brake 62 having a brake disk 77 and disk brake 63 having a brake disk 78. Brake unit 60 is arranged between the stabilizer support 55 and the adjacent stabilizer arm 53, whereas brake unit 61 is arranged between the stabilizer support 56 and the adjacent stabilizer arm 54. The brake units 60, 61 are constructed for operating independently from one another, e.g. electromechanically or hydraulically. Thus, the left and right sides 64, 65 of the chassis arrangement 50 can be individually controlled. The brake units 60, 61 can be continuously operated between a fixed rotative engagement and a fully disengaged state.

A controller 66 is operatively connected to the brake units 60, 61 and can be manipulated by the driver before or during operation of the motor vehicle in order to adjust the chassis characteristic between a sporty ride and a more comfortable ride. The controller 66 receives signals from a sensor assembly, generally designated by reference numeral 67 and including sensors 68-71, 73-75. Sensors 68, 69 are hereby acceleration sensors for ascertaining the transversal acceleration of the motor vehicle and the acceleration in travel direction F. Sensor 70 is a speed sensor for determining the travel speed of the motor vehicle. Sensor 71 is a roadway sensor for ascertaining the coefficient of adhesion and/or a temperature of the road surface. Sensors 73, 74 are wheel carrier compression sensors which are associated to each wheel carrier 72 of the chassis arrangement 50. Sensor 75 is configured to ascertain meteorological data such as outside temperature and precipitation. All sensors 68-71, 73-75 are operatively connected to the controller 66 via signal transmission lines 76.

Figure 3:
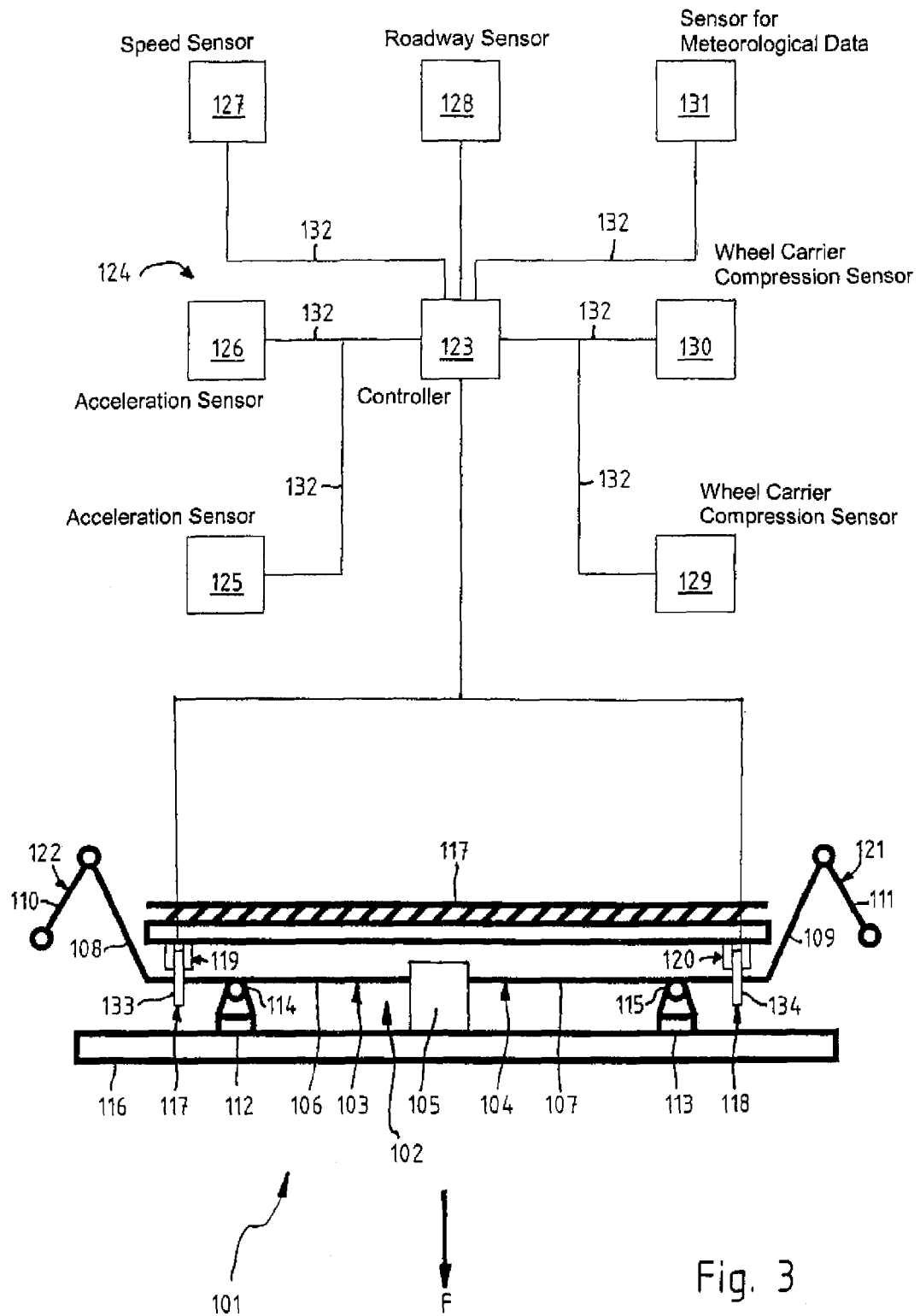
FIG. 3 is a schematic top plan view of a third embodiment of a chassis arrangement according to the present invention.

FIG. 3 shows a schematic top plan view of a third embodiment of a chassis arrangement according to the present invention, generally designated by reference numeral 101. The chassis arrangement 101 includes a stabilizer 102 having a first stabilizer portion 103 and a second stabilizer portion 104 which are separated from one another in midsection of the stabilizer 102. The stabilizer portions 103, 104 are coupled to one another by a device 105 for influencing the relative rotation between the stabilizer portions 103, 104. The stabilizer portion 103 has an inner part 106 which is made torsionally yielding whereas the stabilizer portion 104 has an inner part 107 which is also made torsionally yielding. Stabilizer arms 108, 109 connect to respective ends of the inner parts 106, 107 for attachment of the stabilizer 102 to wheel carrier units 110, 111. The stabilizer portions 103, 104 are supported on a vehicle body 116 by respective stabilizer supports 112, 113 with rolling-contact bearings 114, 115.

In addition to the device 105 for influencing the relative rotation between the stabilizer portions 103, 104, a brake unit 117 is secured to the stabilizer portion 103 and a brake unit 118 is secured to the stabilizer portion 104, for respectively influencing the twistability of the stabilizer portions 103, 104. The brake units 117, 118 are supported in relation to the vehicle body 116 and constructed as disk brakes 119, 120. Brake unit 117 is hereby disposed between the stabilizer support 112 and the adjacent stabilizer arm 108 and brake unit 118 is disposed between the stabilizer support 113 and the adjacent stabilizer arm 109. The brake units 117, 118 are constructed for operation independently from one another so that the left and right sides 121, 122 of the chassis arrangement 101 can be individually controlled.

A controller 123 is operatively connected to the brake units 117, 118 and the device 105 for influencing the relative rotation between the stabilizer portions 103, 104 and adjustable before and during travel by the driver in order to modify the characteristic of the chassis between a sporty ride and a more comfortable ride for example.

The controller 123 receives signals from a sensor assembly, generally designated by reference numeral 124 and including at least two acceleration sensors 125, 126 for ascertaining the transversal acceleration of the motor vehicle and the acceleration in travel direction F, a speed sensor 127 for determining the travel speed of the motor vehicle, a roadway sensor 128 for monitoring a condition of the road surface by ascertaining the coefficient of adhesion and/or a temperature of the road surface, wheel carrier compression sensors 129, 130 which are associated to each wheel carrier 110, 111 of the chassis arrangement 50, and a sensor 131 to ascertain meteorological data such as outside temperature and precipitation. All sensors 125-131 are operatively connected to the controller 123 via signal transmission lines 132.

The brake units 117, 118 are constructed as disk brakes 119, 120, with disk brake 119 having a brake disk 133 and disk brake 120 having a brake disk 134.

Figure 4:
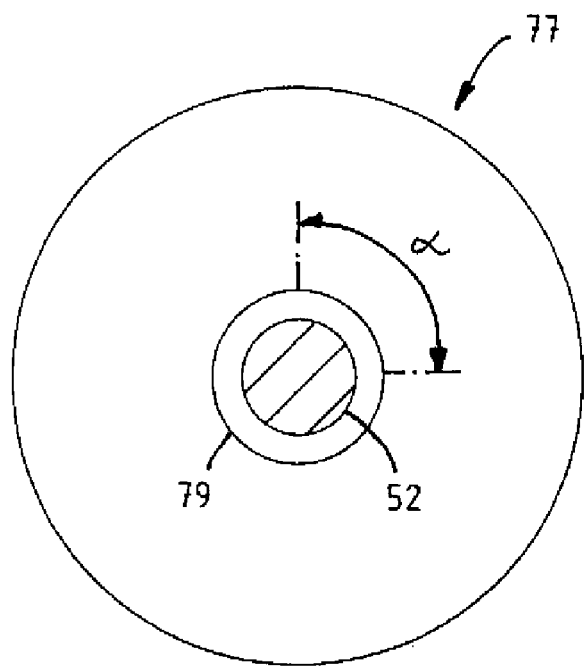
FIG. 4 is a partly sectional view of one variation of a brake disk for use in a chassis arrangement according to the present invention.

Referring now to FIG. 4, there is shown a partly sectional view of one variation of a brake disk for use in the chassis arrangement 50 or 101. By way of example, the brake disk in FIG. 4 has been labeled as the brake disk 77 of brake unit 60. As the brake disks 77, 78, 133, 134 can be made of identical construction, it will be understood by persons skilled in the art that a description of brake disk 77 is equally applicable to the other brake disks. The brake disk 77 is detachably secured via hub 79 to the center part 52. If the brake disk 133 or 134 of the chassis arrangement 102 were referred to, the brake disk 133 or 134 would be detachably connected via the hub 79 to the stabilizer portions 103, 104, respectively. The brake disk 77 can be secured in several positions to the center part 52 by turning the brake disk 77 about a rotation angle α in circumferential direction. An indexed securement of the brake disk 77 to the center part 52 via the hub 79 can be realized in many ways, e.g. using several grooves. These are known to an artisan so that a further description has been omitted for the sake of simplicity.

Figure 5:
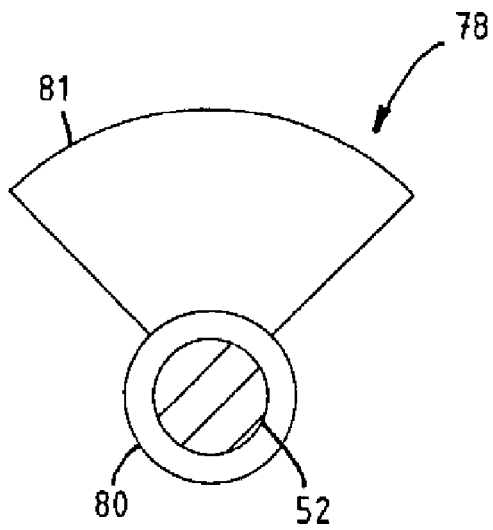
FIG. 5 is a partly sectional view of another variation of a brake disk for use in a chassis arrangement according to the present invention.

FIG. 5 shows another variation of a brake disk for use in the chassis arrangement 50 or 101. By way of example, the brake disk in FIG. 5 has been labeled as the brake disk 78 of brake unit 61. In this variation, the brake disk 78 is mounted to a hub 80 and constructed to have a braking zone 81 in the form of a ring segment only, instead of a complete ring, as shown in FIG. 4. In this way, weight is reduced.

Common to the chassis arrangements 1, 50, 101 is their capability to actively change the vehicle body vibration through a targeted braking action of the brake units 18, 60, 61, 117, 118 so that the twistability of the stabilizer 2, 51, 102 can be influenced in a simple manner. There is no need for the provision of dampers and overall costs are reduced compared to conventional systems.

Figure 7:
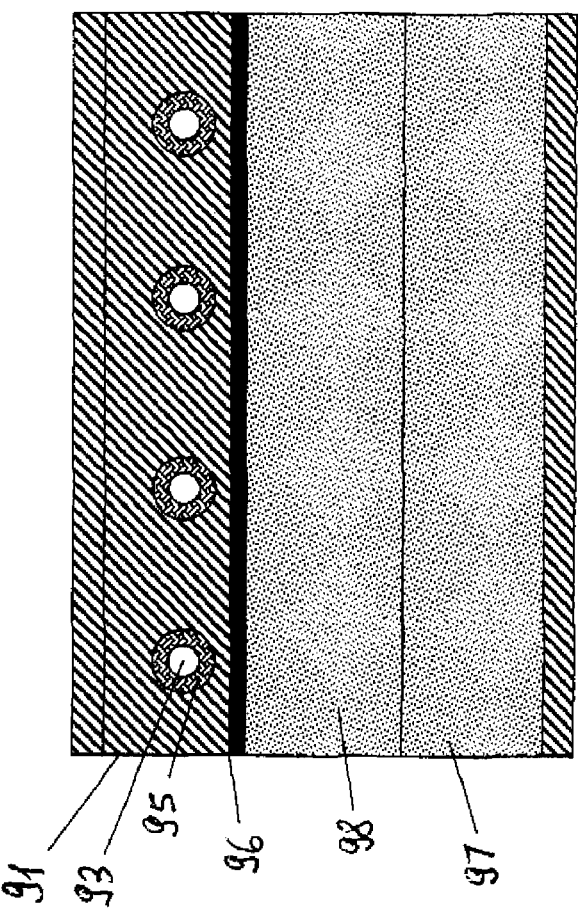
FIG. 7 is 90° rotated sectional view of the torsional vibration damper of FIG. 6.
Figure 6:
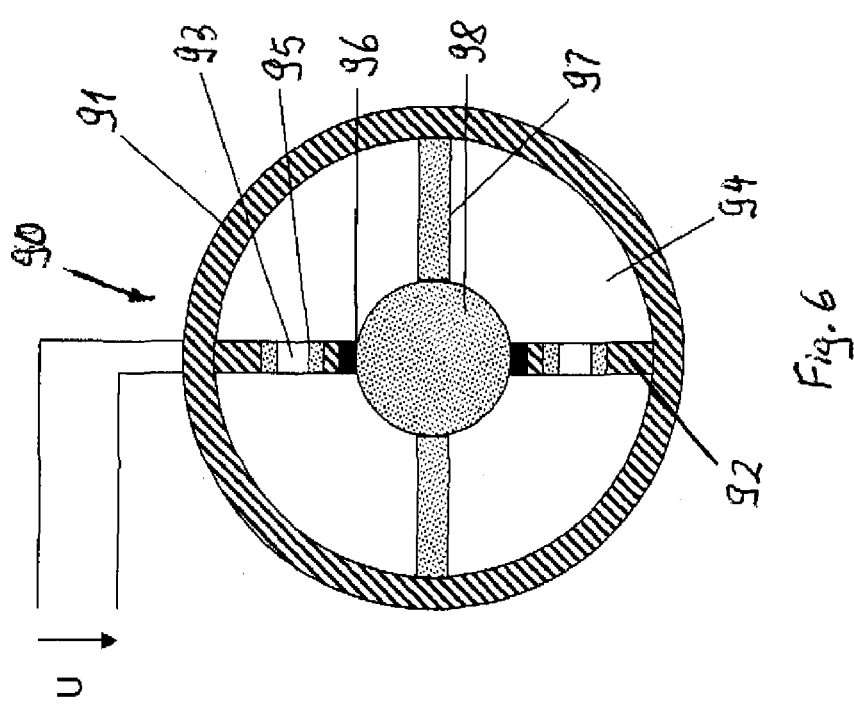
FIG. 6 is a sectional view of a torsional vibration damper for use in a motor vehicle suspension.

Turning now to FIGS. 6 and 7, there are shown sectional view of a torsional vibration damper, generally designated by reference numeral 90, for targeted incorporation of an elasticity in motor vehicle suspensions for changing a vibration behavior, i.e. reducing a transfer of unwanted vibration. The torsional vibration damper 90 is attached to an unillustrated chassis member and includes a ring-shaped stator 91 forming the outside circumference of the damper 90 and having stator vanes 92. The stator vanes 92 have bores 93 for passage of a magneto-rheological liquid 94. Disposed in concentric surrounding relationship to each of the bores 93 is an electromagnet 95 which applies an electromagnetic field through the magneto-rheological liquid 94 in order to influence a viscosity of the liquid. The stator vanes 92 have grooves for seals 96. Disposed inside the stator 91 is a rotor 97 which extends out from a hub 98 forming a stabilizer.

The torsional vibration damper 90 operates as follows: When the rotor 97 is caused to rotate, the magneto-rheological liquid 94 is moved through one or more of the bores 93 in the stator 90. Applying an electric voltage U from an unillustrated voltage source to the electromagnets 95 causes a change in the viscosity of the magneto-rheological liquid 94 in proximity of the bores 93 to thereby adjust the damping torsional resistance of the magneto-rheological liquid 94.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A chassis arrangement, comprising:
   a stabilizer having a first stabilizer portion and a second stabilizer portion separated in midsection of the stabilizer;
   a brake unit coupling the first and second stabilizer portions for influencing a relative rotation between the first and second stabilizer portions, said brake unit being constructed in the form of a disk brake;
   a controller operatively connected to the brake unit;
   a sensor assembly operatively connected to the controller and including a sensor for ascertaining meteorological data; and
   a bearing unit disposed between neighboring ends of the first and second stabilizer portions for mutually supporting the first and second stabilizer portions.

2. The chassis arrangement of claim 1, wherein the brake device includes a brake caliper secured to the end of one of the first and second stabilizer portions, and a brake disk secured to the end of the other one of the first and second stabilizer portions.

3. The chassis arrangement of claim 1, wherein the bearing unit has a housing for outside attachment of the brake disk.

4. The chassis arrangement of claim 1, wherein the bearing unit is constructed as a roller bearing or ball bearing.

5. The chassis arrangement of claim 1, wherein the bearing unit is constructed as a sliding bearing.

6. The chassis arrangement of claim 1, wherein the disk brake has a brake disk which is detachably secured to the center part.

7. The chassis arrangement of claim 6, wherein the brake disk is constructed for selective securement to the center part in several positions spaced about a rotation angle in circumferential direction of the brake disk.

8. The chassis arrangement of claim 7, wherein the brake disk has a brake zone in the form of a ring segment.

9. The chassis arrangement of claim 1, wherein the brake unit is constructed for continuous adjustability between a fixed rotative engagement and a fully disengaged state.

10. The chassis arrangement of claim 1, wherein the brake unit is constructed for a multistage adjustability between a fixed rotative engagement and a fully disengaged state.

11. The chassis arrangement of claim 1, wherein the brake unit is constructed for electromechanical operation.

12. The chassis arrangement of claim 1, wherein the brake unit is constructed for hydraulic operation.

13. The chassis arrangement of claim 1, wherein the brake unit is constructed as an eddy current brake.

14. The chassis arrangement of claim 1, further comprising a support unit for supporting the brake unit in relation to a vehicle body.

15. The chassis arrangement of claim 1, further comprising a support unit for supporting the brake unit in relation to a chassis underframe.

16. The chassis arrangement of claim 1, wherein the controller is adjustable by a driver of a motor vehicle equipped with the chassis arrangement.

17. The chassis arrangement of claim 1, wherein the sensor assembly includes at least one acceleration sensor.

18. The chassis arrangement of claim 1, wherein the sensor assembly includes a plurality of acceleration sensors for ascertaining accelerations in different effective directions.

19. The chassis arrangement of claim 1, wherein the sensor assembly includes a speed sensor.

20. The chassis arrangement of claim 1, wherein the sensor assembly includes a sensor for ascertaining the condition of a road surface.

21. The chassis arrangement of claim 1, wherein the sensor assembly includes at least one sensor for detecting a wheel carrier compression.

22. A chassis arrangement, comprising:
a stabilizer including a single-piece center part having opposite ends, a first stabilizer arm connected to one of the opposite ends of the center part, and a second stabilizer arm connected to the other one of the opposite ends of the center part;
a stabilizer support assembly having two support units for supporting the center part in relation to a vehicle body;
at least two brake units operatively connected to the center part for influencing a twistability of the center part, with one of the brake units being arranged between one of the support units and an adjacent one of the first and second stabilizer arms, and the other one of the brake units being arranged between the other one of the support units and an adjacent one of the first and second stabilizer arms;
a controller operatively connected to at least one of the brake units; and
a sensor assembly operatively connected to the controller and including a sensor for ascertaining meteorological data.

23. The chassis arrangement of claim 22, wherein at least one of the brake units is a disk brake.

24. The chassis arrangement of claim 23, wherein the disk brake has a brake disk which is detachably secured to the center part.

25. The chassis arrangement of claim 24, wherein the brake disk is constructed for selective securement to the center part in several positions spaced about a rotation angle in circumferential direction of the brake disk.

26. The chassis arrangement of claim 24, wherein the brake disk has a brake zone in the form of a ring segment.

27. The chassis arrangement of claim 22, wherein the brake units are constructed for independent operation.

28. The chassis arrangement of claim 22, wherein at least one of the brake units is constructed for continuous adjustability between a fixed rotative engagement and a fully disengaged state.

29. The chassis arrangement of claim 22, wherein at least one of the brake units is constructed for a multistage adjustability between a fixed rotative engagement and a fully disengaged state.

30. The chassis arrangement of claim 22, wherein at least one of the brake units is constructed for electromechanical operation.

31. The chassis arrangement of claim 22, wherein at least one of the brake units is constructed for hydraulic operation.

32. The chassis arrangement of claim 22, wherein at least one of the brake units is constructed as an eddy current brake.

33. The chassis arrangement of claim 22, further comprising a support unit for supporting at least one of the brake units in relation to a vehicle body.

34. The chassis arrangement of claim 22, further comprising a support unit for supporting at least one of the brake units in relation to a chassis underframe.

35. The chassis arrangement of claim 22, wherein the controller is adjustable by an operator of a motor vehicle equipped with the chassis arrangement.

36. The chassis arrangement of claim 22, wherein the sensor assembly includes at least one acceleration sensor.

37. The chassis arrangement of claim 22, wherein the sensor assembly includes a plurality of acceleration sensors for ascertaining accelerations in different effective directions.

38. The chassis arrangement of claim 22, wherein the sensor assembly includes a speed sensor.

39. The chassis arrangement of claim 22, wherein the sensor assembly includes a sensor for ascertaining the condition of a road surface.

40. The chassis arrangement of claim 22, wherein the sensor assembly includes a sensor for detecting a wheel carrier compression.

41. A chassis arrangement, comprising:
a stabilizer having a first stabilizer portion and a second stabilizer portion separated in midsection of the stabilizer;
a device, coupling the first and second stabilizer portions, for influencing a relative rotation capability between the first and second stabilizer portions;
a stabilizer support assembly having a first and second stabilizer supports for respectively supporting the first and second stabilizer portions in relation to a vehicle body;

a first brake unit secured to one of the first and second stabilizer portions for affecting a twistability of the one of the first and second stabilizer portions; and a second brake unit secured to the other one of the first and second stabilizer portions for affecting a twistability of the other one of the first and second stabilizer portions, wherein the first brake unit is disposed between one of the first and second stabilizer supports and the device, and the second brake unit is disposed between the other one of the first and second stabilizer supports and the device.

42. The chassis arrangement of claim 41, wherein the first brake unit is disposed between one of the first and second stabilizer supports and an adjacent stabilizer arm of one of the first and second stabilizer portions, and the second brake unit is disposed between the other one of the first and second stabilizer supports and an adjacent stabilizer arm of the other one of the first and second stabilizer portions.

43. The chassis arrangement of claim 41, wherein at least one of the first and second brake units is a disk brake.

44. The chassis arrangement of claim 43, wherein the disk brake has a brake disk which is detachably secured to the associated one of the first and second stabilizer portions.

45. The chassis arrangement of claim 44, wherein the brake disk is constructed for selective securement to the associated one of the first and second stabilizer portions in several positions spaced about a rotation angle in circumferential direction of the brake disk.

46. The chassis arrangement of claim 44, wherein the brake disk has a brake zone in the form of a ring segment.

47. The chassis arrangement of claim 41, wherein the first and second brake units are constructed for continuous adjustability between a fixed rotative engagement and a fully disengaged state.

48. The chassis arrangement of claim 41, wherein the first and second brake units are constructed for a multistage adjustability between a fixed rotative engagement and a fully disengaged state.

49. The chassis arrangement of claim 41, wherein at least one of the first and second brake units is constructed for electromechanical operation.

50. The chassis arrangement of claim 41, wherein at least one of the first and second brake units are constructed for hydraulic operation.

51. The chassis arrangement of claim 41, wherein at least one of the first and second brake units are constructed as an eddy current brake.

52. The chassis arrangement of claim 41, further comprising a support unit for supporting at least one of the first and second brake units in relation to a vehicle body.

53. The chassis arrangement of claim 41, further comprising a support unit for supporting at least one of the first and second brake units in relation to a chassis underframe.

54. The chassis arrangement of claim 41, further comprising a controller operatively connected to at least one member selected from the group consisting of at least one of the first and second brake units and the device for influencing a relative rotation capability between the first and second stabilizer portions.

55. The chassis arrangement of claim 54, wherein the controller is adjustable by an operator of a motor vehicle equipped with the chassis arrangement.

56. The chassis arrangement of claim 54, further comprising a sensor assembly operatively connected to the controller.

57. The chassis arrangement of claim 56, wherein the sensor assembly includes at least one acceleration sensor.

58. The chassis arrangement of claim 56, wherein the sensor assembly includes a plurality of acceleration sensors for ascertaining accelerations in different effective directions.

59. The chassis arrangement of claim 56, wherein the sensor assembly includes a speed sensor.

60. The chassis arrangement of claim 56, wherein the sensor assembly includes a sensor for ascertaining the condition of a road surface.

61. The chassis arrangement of claim 56, wherein the sensor assembly includes a sensor for detecting a wheel carrier compression.

62. The chassis arrangement of claim 56, wherein the sensor assembly includes a detector for ascertaining meteorological data.

63. A chassis arrangement, comprising:
a stabilizer having a first stabilizer portion and a second stabilizer portion separated in midsection of the stabilizer;
a device, coupling the first and second stabilizer portions, for influencing a relative rotation capability between the first and second stabilizer portions;
a stabilizer support assembly having a first and second stabilizer supports for respectively supporting the first and second stabilizer portions in relation to a vehicle body;
a first brake unit secured to one of the first and second stabilizer portions for affecting a twistability of the one of the first and second stabilizer portions; and
a second brake unit secured to the other one of the first and second stabilizer portions for affecting a twistability of the other one of the first and second stabilizer portions,
wherein the first and second brake units are constructed for independent operation.

* * * * *